United States Patent [19]
Boatright

[11] Patent Number: 6,107,468
[45] Date of Patent: *Aug. 22, 2000

[54] HIGHLY SOLUBLE PROTEIN, METHOD FOR MAKING, AND FOOD PRODUCTS MADE THEREOF

[75] Inventor: William L. Boatright, Fayetteville, Ark.

[73] Assignee: Board of Trustees of the University of Arkansas, Little Rock, Ark.

[*] Notice: This patent is subject to a terminal disclaimer.

[21] Appl. No.: 09/109,941

[22] Filed: Jul. 6, 1998

Related U.S. Application Data

[63] Continuation of application No. 08/684,817, Jul. 22, 1996, Pat. No. 5,777,080, which is a continuation of application No. 08/241,272, May 9, 1994, abandoned.

[51] Int. Cl.⁷ .............................. A61K 35/78; A23J 1/00
[52] U.S. Cl. ................. 530/378; 530/370; 530/375; 530/377; 530/412; 530/418; 530/419; 530/422; 530/423; 530/427
[58] Field of Search ..................................... 530/378, 370, 530/375, 377, 402, 412, 418, 419, 422, 423, 427

[56] References Cited

U.S. PATENT DOCUMENTS 2,564,106  8/1951  Gribbins et al. .................... 530/370

FOREIGN PATENT DOCUMENTS 57-074384  5/1982  Japan .

OTHER PUBLICATIONS

Annual Meetings of Inform (Abstract) vol. 4, No. 4 1993.

*Primary Examiner*—Christopher S. F. Low
*Assistant Examiner*—Abdel A. Mohamed
*Attorney, Agent, or Firm*—Gilbreth & Associates, P.C.; J. M. (Mark) Gilbreth

[57] ABSTRACT

Disclosed is a method of obtaining a highly soluble protein which method generally includes at least the step of contacting the protein with an amount of antioxidant suitable to raise the solubility of the protein, which method may also be utilized to raise the protein yield of the process. Antioxidants suitable for use in the present invention include substituted and unsubstituted quinones, anisoles, toluenes and tocopherols. Also disclosed is a highly soluble protein which includes a protein and added antioxidant. Further disclosed are food products made from a highly soluble protein. Finally, a method of processing food products is disclosed which at least includes the step of incorporating a highly soluble protein into the food product.

14 Claims, No Drawings

HIGHLY SOLUBLE PROTEIN, METHOD FOR MAKING, AND FOOD PRODUCTS MADE THEREOF

This application is a continuation application of U.S. patent application Ser. No. 08/684,817 filed Jul. 22, 1996 issued as U.S. Pat. No. 5,777,080 which is a continuation of U.S. patent application 08/241,272 filed May 9, 1994 now abandoned.

BACKGROUND OF THE INVENTION

1. Field of the Invention

The present invention relates to proteins, to a method of obtaining proteins, to food products, and to a method of processing food products. In another aspect, the present invention relates to proteins having high solubility, to a method of obtaining highly soluble proteins, to a method of increasing protein yield, to food products made from highly soluble proteins, and to a method of processing food products. In yet another aspect, the present invention relates to highly soluble food grade plant proteins, to a method of obtaining highly soluble food grade plant proteins utilizing antioxidants, to a method of increasing the protein yield utilizing antioxidants, to food products made from such highly soluble food grade plant proteins, and to a method of processing food products utilizing antioxidants.

2. Description of the Related Art

Proteins find utility in a broad range of applications in the food processing industry for both human and animal consumption. For example, for human consumption vegetable proteins are used in the making of non-dairy whip topping, non-dairy creamer, meat analogues, cheese analogues, seafood analogues, tofu, extruded snack items, beverages, confections, soups, pastas, breads, as well as infant formula, as well as a whole host of processed meat products.

Food grade soybean proteins have been available for many years, and are readily extracted from defatted flour by water at pH 6.6, but the proteins obtained by the prior art methods are only slightly soluble at this pH after isolation by acid precipitation.

Unfortunately, in order to be applicable for use in most food systems, a protein must have good solubility in water or mildly acidic solutions. Therefore, attempts have been made in the prior art to study and to improve the solubility of soybean protein isolates.

U.S. Pat. No. 4,464,296, issued Aug. 7, 1984 to Jacks et al. discloses a method of improving the solubility of dry protein in aqueous or acidic media after treatment with a concentrated (30%) hydrogen peroxide solution. In this process, the protein is mixed with hydrogen peroxide and the mixture centrifuged for sufficient time to effect clarification. Unfortunately, this process suffers from the limitation of having to remove the concentrated hydrogen peroxide as it renders the protein unsuitable for food applications. Thus, the hydrogen peroxide is removed by dialyzing the supernatant against water containing sufficient catalase to remove the hydrogen peroxide. The protein is then freeze dried.

U.S. Pat. No. 4,474,694, issued Oct. 2, 1984 to Coco et al., discloses a process for making a modified protein for use as an adhesive binder. The method includes treating defatted soybean flakes with an alkaline solution to solubilize the protein. Next, the protein extract is then separated from the alkali insoluble solids by filtration or centrifugation. Next, the soy protein is treated with a reducing agent, followed by treatment with a carboxylic acid anhydride. The patent states that "[t]his treatment step is important in that the use of a reducing agent with modification by reaction with the carboxylic acid anhydride results in a modified protein material which has unusual rheological characteristics when employed as an adhesive binder in a pigment containing coating composition.

U.S. Pat. No. 4,551,274, issued Nov. 5, 1985 to Shen discloses as prior art that chemical reducing agents may be utilized to increase the solubility of vegetable protein material, but are somewhat ineffective because of the relative inaccessibility of the protein disulfide bonds to the reducing agents. Additionally, chemical reducing agents will many times render the protein product unsuitable for food applications. As an improvement, the '274 patent discloses the electrolytic treatment of vegetable protein to reduce the disulfide bonds to provide a dissociated protein material which has an improved degree of solubility. This electrolytic process suffers from the limitation of requiring apparatus to carry out the electrolysis.

Typical protein products derived from protein flour or flakes includes protein isolates and protein concentrates. The protein yield is generally the percentage of the protein in the flour or flakes that is recovered in the protein product. As the protein yield effects the economics of protein processing, higher protein yields are always desirable.

Thus, there is a need in the art for an improved food grade protein not suffering from the deficiencies of the prior art proteins.

There is another need in the art for a highly soluble food grade protein not suffering from the limitations of the prior art.

There is yet another need in the art for a method for obtaining highly soluble proteins.

There is still another need in the art for a method of obtaining highly soluble food grade proteins.

There is even another need in the art for food products containing highly soluble food grade proteins.

There is still yet another need in the art for a method of processing food products utilizing highly soluble food grade proteins.

There is still yet even another need in the art for a method of increasing the overall protein yield of protein processing methods.

These and additional needs of the art will become readily apparent to those of skill in the art upon review of this patent specification.

SUMMARY OF THE INVENTION

It is one object of the present invention to provide an improved food grade protein not suffering from the deficiencies of the prior art proteins.

It is another object of the present invention to provide a highly soluble food grade protein.

It is yet another object of the present invention to provide a method for obtaining highly soluble proteins.

It is still another object of the present invention to provide a method of obtaining highly soluble food grade proteins.

It is even another object of the present invention to provide for food products containing a highly soluble food grade protein.

It is still yet another object of the present invention to provide a method of producing food products utilizing highly soluble food grade proteins.

It is even still yet another object of the present invention to provide a method of increasing the protein yield of protein processing methods.

These and additional objects of the present invention will become readily apparent to those of skill in the art upon review of this patent specification.

According to one embodiment of the present invention there is provided a method of obtaining highly soluble food grade proteins. The method generally includes at least the step of contacting the protein with an amount of antioxidant suitable to obtain a highly soluble protein, prior to or at the same time that the protein contacts water. Antioxidants suitable for use in the present invention include substituted and unsubstituted quinones, anisoles, toluenes, tocopherols, gallates, esters, esters of benzoic acids as well as antioxidants derived from plants. The full method generally includes the dispersion of the antioxidant into water, followed by addition of protein to the antioxidant and water mixture. Alternatively, the protein and the antioxidant can first be contacted together and then incorporated into a water mixture. Subsequently, the protein is then recovered, generally as a protein isolate or a protein concentrate.

In the recovery of a protein isolate, it is sometimes necessary to raise the pH of the antioxidant and water mixture to improve the solubilization of the protein into the mixture. The insoluble materials are removed from the mixture by, for example, centrifuge or filtration. The pH of the mixture is then lowered to about its isoelectric point to precipitate protein. This protein is then recovered by, for example, centrifugation or filtration and neutralized to render a highly soluble protein isolate.

In the recovery of protein concentrate, the protein in the mixture is first rendered insoluble, generally by lowering the pH to about its isoelectric point, by adding alcohol or by raising the temperature. This isoluble protein is then separated from the soluble carbohydrates. If possible, solubility is restored to the protein. For example, if the pH was initially lowered it is now raised to restore the solubility, if alcohol was added, its removal will generally somewhat restore the pH. In contrast, if the protein was initially rendered insoluble with heat, it is generally permanently denatured and its solubility cannot be restored. The protein is recovered as a concentrate.

According to another embodiment of the present invention there is provided a highly soluble food grade protein. This improved food grade protein generally includes a vegetable protein and a suitable amount of antioxidant to provide a highly soluble protein. Generally, this improved food grade protein will include in the range of about 0.1 to about 5000 ppm of antioxidant, based on the total weight of the food grade protein. Antioxidants suitable for use in the present invention include substituted and unsubstituted quinones, anisoles, toluenes, tocopherols, gallates, esters, esters of benzoic acids as well as antioxidants derived from plants.

According to yet another embodiment of the present invention there are provided food products having incorporated therein highly soluble food grade proteins. The food product generally includes a food grade protein that has been contacted with an amount of antioxidant suitable to provide a highly soluble protein. Examples of food products include non-dairy whip topping, non-dairy creamer, meat analogues, cheese analogues, seafood analogues, tofu, extruded snack items, beverages, confections, soups, pastas, breads, as well as infant formula.

According to still another embodiment of the present invention there is provided a method of processing food products. The method generally includes at least the step of incorporating into the food product, a highly soluble protein that has been contacted with an antioxidant prior to contact with water.

DETAILED DESCRIPTION OF THE INVENTION

In the practice of the present invention, a protein, antioxidant and water mixture will be formed. Obtaining a highly soluble protein requires contacting the protein with the antioxidant, prior to or at the same time that the protein contacts the water. For example, the protein and the antioxidant may be contacted together and then added to the water, or the antioxidant may be dispersed into the water followed by the addition of the protein to the water and antioxidant mixture. While not wishing to be limited by theory, the inventor believes that contacting the protein with an antioxidant, either prior to or concurrently with water contact provides the optimum improvement in final product solubility.

Once the protein, water and antioxidant mixture is formed, the subsequent steps in the practice of the present invention will depend upon whether a protein isolate or protein concentrate is to be recovered.

Protein isolate is obtained from the protein, water and antioxidant mixture by separating the soluble proteins from the insoluble materials, and then precipitating, washing, neutralizing and recovering the protein as an isolate. Protein concentrate is obtained from the protein, water and antioxidant mixture by first rendering the protein insoluble, separating the insoluble protein from the soluble carbohydrates, rendering the protein soluble if possible, and then recovering the protein as a concentrate.

Typically, the ratio of antioxidant to water is in the range of about 0.05 milligrams to about 50 milligrams of antioxidant per liter of water. Preferably the ratio of antioxidant to water is in the range of about 0.2 milligrams to about 16 milligrams antioxidant per liter of water, and most preferably in the range of about 0.4 milligrams to about 8 milligrams antioxidant per liter of water.

Where the antioxidant is first dispersed into the water, it may be dispersed directly in water at the desired concentration, or it may first be dispersed in water at a higher concentration as a premix, which premix is then later added to water to achieve the desired end concentration. A premix is generally utilized when there are concerns about properly dispersing the antioxidant in the water.

Dispersion of the antioxidant in water is generally achieved utilizing any suitable mixing, stirring, homogenizing or dispersing apparatus. Non-limiting examples of such suitable apparatus include a high shear mixer or a sonicator.

The dispersing time is generally in the range of about 1 second to about 24 hours. Preferably, the dispersing time is in the range of about 1 minute to about 500 minutes, and most preferably in the range of about 10 minutes to about 60 minutes.

The antioxidant is generally dispersed into the water at a temperature and pressure suitable to maintain the water in liquid form. Typical temperatures are generally between about 0° C. and about 100° C., with pressures generally between about 1 psi to about 1000 psi.

Where the antioxidant and the protein are first contacted together, any suitable means and methods may be utilized. For example, the antioxidant may be sprayed onto the protein. This antioxidant covered protein is then added to water to form a mixture.

Antioxidants utilized in the present invention may be any antioxidant suitable to achieve the desired protein solubility, including naturally occurring antioxidants and synthetic antioxidants. Preferably, the antioxidants utilized in the present invention are those which prevent, hinder or reduce the oxidation of lipids.

Examples of generally suitable antioxidants include substituted and unsubstituted quinones, anisoles, toluenes, tocopherols, gallates, esters, esters of benzoic acids as well as antioxidants derived from plants. Preferable examples of suitable antioxidants utilized include propyl gallate (n-propyl ester of 3,4,5-tri-hydroxy-benzoic acid); tertiary butylated hydroquinone ("TBHQ"); butylated hydroxy anisole ("BHA"), such as for example 3-tertiarybutyl-4-hydroxyanisole or 2-tertiarybutyl-4-hydroxyanisole; butylated hydroxy toluene ("BHT"), such as for example 2,3-di-tert-butyl-p-cresol; alpha-, beta-, gamma-or delta-tocopherol; or mixtures thereof. More preferable examples of suitable antioxidants for use in the present invention include tocopherols, TBHQ or BHA.

Most preferred synthetic antioxidants are TBHQ or BHA.

Most preferred antioxidants which are naturally occuring in soybeans are tocopherols.

Commercially available antioxidants include those available from Eastman Chemical Company under various TENOX™ brand designations, such as TENOX™ 20 (TBHQ), TENOX™ 22 (a 20:6 by weight mixture of BHA/TBHQ), TENOX™ GT-1 and GT-2. TENOX™ GT-1 antioxidant and GT-2 antioxidant contain natural tocopherols, with TENOX™ GT-1 antioxidant comprising a 50:50 weight ratio of tocopherols and vegetable oil, and TENOX™ GT-2 antioxidant comprising a 70:30 weight ratio of tocopherols and vegetable oil.

Where the antioxidant is first dispersed in the water, the next step is to add protein to the water and antioxidant mixture. Where the protein and antioxidant are first contacted together, the next step is to add the contacted protein/antioxidant to the water.

Any suitable type of protein may be utilized in the practice of the present invention. Preferably, the protein utilized is a food grade protein, more preferably a food grade plant protein. More preferably, the protein utilized in the practice of the present invention is a soy protein, and most preferably a hexane defatted soy protein flour or flake.

The defatted proteins utilized in the present invention and the recovered proteins will typically comprise in addition to the protein component, carbohydrates, lipids, ash and acids. For example, a typical hexane defatted soybean meal may comprise 49% protein (N×5.71), 38% total carbohydrates, 2–6% total lipids, 6% ash, and 1.5% phytic acid, and the recovered isolate may comprise 85% protein (N×5.71), 2.3% total carbohydrates, 2–5% total lipids, 3.5% ash, and 2.0% phytic acid Whether adding the protein to the water and antioxidant dispersion, or adding the contacted protein and antioxidant to water, any suitable mixing, stirring, homogenizing or dispersing apparatus may be utilized.

In the practice of the present invention, the protein, water and antioxidant mixture is generally dispersed for an amount of time in the range of about 1 second to about 24 hours. Preferably, the dispersing time is in the range of about 1 minute to about 500 minutes, and most preferably in the range of about 10 minutes to about 60 minutes.

The protein, water and antioxidant are typically contacted together at temperatures and pressures suitable to maintain the water in liquid form, and suitable so that the protein is not undesireably degraded. Typical temperatures are generally between about 0° C. and about 100° C., preferably between about 20° C. and about 60° C., with pressures generally between about 1 psi to about 1000 psi.

The ratio of antioxidant to protein must be suitable to obtain a protein having the desired solubility. Generally, in the range of about 0.1 to about 5000 parts of antioxidant is added per million parts of protein. Preferably, in the range of about 2 to about 1000 parts of antioxidant is added per million parts of protein, more preferably, in the range of about 4 to about 500 parts of antioxidant is added per million parts of protein, and most preferably, in the range of about 6 to about 500 parts of antioxidant is added per million parts of protein.

When recovering protein isolates, it may be necessary to raise the pH of the water, antioxidant and protein mixture to improve the solubility of the added protein. Generally, any suitable base may be utilized to raise the pH of the mixture. Preferably, a food grade base is utilized to raise the pH of the mixture, most preferably, sodium hydroxide is utilized. The pH of the mixture is generally raised to a pH suitable to improve the solubilization of the protein, generally to a pH of about 9. The normality of the base used to raise the pH is selected to achieve the desired pH.

Once the water, protein and antioxidant mixture has been produced, protein isolates are recovered by separating the soluble proteins from any solid insolubles. Any suitable technique for separating liquids from solid insolubles may be utilized in the practice of the invention. Non-limiting examples of suitable method of separating the solid insolubles from the mixture include centrifuging and filtration.

In the recovery of protein isolates, the liquid remaining after separating the solids from the mixture will primarily contain protein and carbohydrates. It is generally necessary to reduce the pH to precipitate the proteins from the mixture. The pH of the mixture may be reduced by the addition of an acid to precipitate the protein. For example, hydrochloric acid may be added to the mixture to reduce the pH to about 4.5 to precipitate protein.

The protein precipitated from the mixture is recovered as a protein isolate. Any suitable technique for separating liquids from solid insolubles may be utilized to recover the protein from the mixture. Non-limiting examples of suitable methods of separating the protein from the mixture include centrifuging and filtration. At this point, the recovered protein isolate may optionally be subjected to one or more water rinses.

After the protein isolate is recovered from the mixture, it is contacted with a suitable base to raise its pH to about 7. Preferably, a food grade base is utilized to raise the pH of the protein to 7, most preferably, sodium hydroxide is utilized.

The recovered highly soluble protein isolate will generally comprise amounts of antioxidant which have been carried through the processing. In fact, soybeans naturally contain low levels of tocopherols, most of which are removed by the defatting process, minor amounts of which are passed on to the final recovered product. Commercially available soy protein isolates contain naturally occurring tocopherols which have survived processing, generally in the range of 4.6 to 11.7 ppm total of beta- and gamma-tocopherols based on the weight of protein (N×5.71), and in the range of about 2.9 to about 3.1 ppm of delta-tocopherol based on the weight of protein (N×5.71). Thus, where antioxidants naturally occurring in a particular protein are utilized, the recovered highly soluble protein isolate will contain amounts of that antioxidant above the naturally occuring amounts which survive processing.

Where beta- and gamma-tocopherols are utilized in the present invention, the highly soluble soyprotein isolates recovered will generally contain at least about 12 ppm total of beta- and gamma-tocopherols based on the weight of protein (N×5.71). Preferably, the highly soluble soy protein isolates recovered will contain at least about 20 ppm total of beta- and gamma-tocopherols based on the weight of protein (N×5.71), more preferably at least about 30 ppm total of beta- and gamma-tocopherols, and most preferably at least about 40 ppm total of beta- and gamma-tocopherols.

Where delta-tocopherols are utilized in the present invention, the highly soluble soy protein isolates recovered will generally contain at least about 3.5 ppm of delta-tocopherol based on the weight of protein (N×5.71). Preferably, the highly soluble soy protein isolates recovered will generally contain at least about 5 ppm of delta-tocopherol based on the weight of protein (N×5.71), more preferably at least about 10 ppm delta-tocopheral, and most preferably at least about 20 ppm delta-tocopheral.

Where antioxidants not normally found in the protein are utilized, the highly soluble protein isolate recovered will generally comprise in the range of about 0.1 to about 5000 ppm of synthetic antioxidant based on the weight of the protein (N×5.71). As used herein, the term "synthetic antioxidant" will refer to antioxidants not normally or naturally occurring in the particular protein. For those antioxidants not naturally found in the particular protein, the recovered highly soluble protein isolate will generally comprise in the range of about 0.1 to about 5000 ppm antioxidant based on the weight of the protein. Preferably, the recovered highly soluble protein isolate will comprise in the range of about 2 to about 1000 ppm of antioxidant based on the weight of the protein (N×5.71), more preferably in the range of about 4 to about 500 ppm of antioxidant, and most preferably in the range of about 6 to about 200 ppm based on the weight of the protein (N×5.71).

The recovered highly soluble proteins of the present invention when compared to untreated proteins, will generally have a percentage increase in solubility in the range of at least 1 percent, wherein the percentage increase= [(invention solubility−untreated solubility)/untreated solubility)]×100. Preferably, the recovered highly soluble proteins of the present invention when compared to untreated proteins, will have an increase in solubility of at least about 35 percent, and more preferably of at least about 50%. Most preferably the recovered highly soluble proteins of the present invention when compared to untreated proteins, will have an increase in solubility of at least about 100 percent.

In addition to producing protein isolates having increased solubility, the method of the present invention may also be utilized to increase the overall recovery, i.e. "protein yield", of protein isolate from defatted flakes or flour. Generally the protein yield can be increased by at least about 0.5%, preferably by at least about 1 percent, more preferably by at least about 2 percent, and most preferably by at least about 4 percent.

The highly soluble proteins of the present invention will find utility in a broad range of applications in the food processing industry for both human and animal consumption. For human consumption proteins are used in the making of non-dairy whip toppings, non-dairy creamers, meat analogues, cheese analogues, seafood analogues, tofu, extruded snack items, beverages, confections, soups, pastas, breads, as well as infant formula. When utilized in such food products, the proteins of the present invention will generally comprise in the range of about 0.1 weight percent to about 99 weight percent, with the exact percentage depending upon the type of food product, type of processing, desired functionality contributed by the protein, and other factors.

Many other protein properties and functionalities are dependent upon the solubility of the protein. Thus, the process of the present invention in addition to providing a highly soluble protein may also be utilized to provide improvements in other protein properties such as viscosity, gel strength and resiliency, foam capacity and stability, emulsion capacity and stability, water sorption, water holding, swelling and flavor.

While the present invention has been described mainly with reference to protein isolates, it is to be understood that the present invention is also applicable to the processing of protein into other products, such as, for example, protein concentrates.

In the production of protein concentrates, a protein, water, and antioxidant mixture is produced as disclosed above to improve the solubility of the end-product protein concentrate. Typically, once the mixture is produced, the solubilization of the protein in the mixture is reduced either by lowering the pH, raising the temperature or by adding an alcohol. This insoluble protein is then separated from the soluble carbohydrates. If possible, solubility is restored to the protein. For example, if the pH was initially lowered it is now raised to restore the solubility, if alcohol was added, its removal will generally somewhat restore the pH. In contrast, if the protein was initially rendered insoluble with heat, it is generally permanently denatured and its solubility cannot be restored. The protein is recovered as a concentrate.

While the present invention has been described mainly with reference to soybean proteins, it is to be understood that the process of the present invention is applicable for increasing the solubility of any type of plant protein, vegetable protein, dairy protein, animal protein, and seafood protein. Non-limiting examples of the types of vegetable proteins to which the present invention may be applied includes concentrates, flours, flakes, including an aqueous extract of a vegetable protein material, and the present invention is not intended to be limited by the exact type of vegetable protein to be treated. Non-limiting examples of other plant proteins which may be processed according to the present invention include sunflower proteins, peanut proteins, sesame proteins, cottonseed proteins and wheat proteins.

EXAMPLES

The present invention will now be described by reference to the following Examples which are intended to illustrate the invention and are not intended to limit the scope of the claims of the invention.

Example 1

Preparation of Hexane Defatted Soybean Flour

Defatted soybean flour was prepared from Forrest variety soybeans as follows. Dehulling was done with a blender and the hulls were aspirated. Full-fat flour was produced with a UDY Cyclone Sample Mill (UDY Corp., Fort Collins, Colo.) without an outlet screen. Sieving was accomplished with an Alpine Air Jet Sieve (Alpine American Corp., Natick, Mass.) with the desired full-fat flour passing through a 60-mesh screen.

One part of the full-fat flour which passed through the 60 mesh screen was mixed with 5 parts hexane, agitated by hand for about three minutes, and centrifuged at 1000×g for about ten minutes. The hexane micella (supernatant) was poured off and discarded. This procedure was repeated three times. The residual hexane was evaporated from the resulting defatted flour in a forced air oven at 30° C. overnight.

Example 2

Soy Protein Isolate ("SPI") Control

The control soy protein isolate ("SPI") was prepared by dispersing hexane defatted soybean flour of Example 1 in water (weight to volume ratio of flour to water was 1:10), followed by the addition of 1 N sodium hydroxide until a pH of 9 was stabilized. After centrifuging, the supernatant was adjusted to a pH of about 4.5 with 1 N HCl to precipitate protein. Following centrifuging the precipitated protein isolate was washed with water and the protein was neutralized to a pH of 7 and freeze dried.

Example 3

Preparation of High Solubility SPI

The high solubility soy protein isolates of the present invention were prepared by as described in Example 2 above for the control soy protein isolates, except that 0.5 grams of either Tenox 20 (TBHQ) or Tenox 22 (TBHQ/BHA), both available from Eastman Chemical Co. were first dispersed by sonification into 50 ml of water to form a premix. A portion of this premix was then added to the water to provide 7 ppm antioxidant (based on parts hexane defatted flour) prior to the addition of the hexane defatted soybean flour. The amount of antioxidant utilized was sufficient to provide antioxidant concentration in the final product of about 200 ppm based on the lipid content.

Example 4

Evaluation of High Solubility SPI 500 mg of the isolate of Examples 2 to be tested was accurately weighed into a 150 ml beaker and dispensed into 40 ml of 0.1 M NaCl solution. After stirring for one hour, the protein dispersions were made to 50 ml with the same solvent and one drop of antifoam B silicone emulsion. Protein solubility was determined by micro-Kjeldahl (N×5.71) as the percent of the total protein remaining in solution after centrifugation at 20,000×g for 10 minutes.

The samples were analyzed for moisture by drying at 130° C. for one hour. Nitrogen contents were determined by micro-Kjeldahl and values were multiplied by 5.71 to calculate protein. Once lipids were extracted from the samples, total lipids were determined as the weight of total solids in the chloroform phase. This testing procedure was repeated on the isolates of Example 3.

Results are presented in TABLE I below which demonstrate that the antioxidants increase the protein solubility from 34% for the control to 55% and 56% for the Tenox™ 20 antioxidant treated sample and the Tenox™ 22 antioxidant treated sample, respectively, for a percent increase of 61.8% and 64.7%, respectively.

TABLE I[a]

EVALUATION OF SPI FROM FORREST VARIETY SOYBEANS

|  | SPI FROM FORREST VARIETY SOYBEANS WITH TENOX ™ 20 antioxidant (Example 3) | SPI VARIETY SOYBEANS VARIETY SOYBEANS WITH TENOX ™ 22 antioxidant (Example 3) | SPI VARIETY SOYBEANS VARIETY SOYBEANS (CONTROL) (Example 2) |
|---|---|---|---|
| % Moisture | 1.8 (0.01)[c] | 2.2 (0.01) | 6.3 (0.19) |
| % Protein (N × 5.71)[b] | 61.0 (0.07) | 83.0 (0.11) | 83.2 (0.53) |
| % Protein Solubility (pH 6.8 +/− 0.2)[b] | 55 (0.3) | 56 (1.2) | 34.0 (1.4) |
| % Total Lipids[bd] | 4.5 (0.a2) | 4.6 (0.07) | 4.63 (0.05) |

[a] the % Moisture and % Protein values are the mean of triplicate determinations, and the % Protein Solubility and % Total Lipids are the mean of triplicate determinations on duplicate extractions.
[b] % by weight on dry basis.
[c] figures in parenthesis are standard error.
[d] lipids extracted by the method of Bligh & Dyer with the major exception that phase separation occured in a freezer overnight instead of the traditional phase separation at room temperature or with a centrifuge.

Example 5

Evaluation of Commercial Soy Protein Isolates

Commercially available samples of soy protein isolates were evaluated using the procedures described in Example 4. The results are shown in TABLE II in which the sample designation "I" and "II" refer to two different commercial soy protein isolate manufacturers, and the sample designations "A" and "B" refer to different samples from each of the manufacturers.

TABLE II[a]

EVALUATION OF COMMERCIALLY AVAILABLE SPI

|  | COMMERCIAL SAMPLE NO. I-A | COMMERCIAL SAMPLE NO. I-B | COMMERCIAL SAMPLE NO. II-A | COMMERCIAL SAMPLE NO. II-B |
| --- | --- | --- | --- | --- |
| % Moisture | 5.5 (0.02)[c] | 7.6 (0.12) | 5.6 (0.17) | 5.3 (0.01) |
| % Protein (N × 5.71)[b] | 83.5 (0.43) | 83.4 (0.37) | 82.2 (0.55) | 83.5 (0.20) |
| % Protein Solubility (pH 6.8 +/− 0.2)[b] | 13 (0.3) | 12 (0.1) | 11 (0.2) | 14 (0.2) |
| % Total Lipids[bd] | 3.9 (0.03) | 4.2 (0.04) | 4.8 (0.02) | 4.8 (0.02) |

[a]the % Moisture and % Protein values are the mean of triplicate determinations, and the % Protein Solubility and % Total Lipids are the mean of triplicate determinations on duplicate extractions.
[b]% by weight on dry basis.
[c]figures in parenthesis are standard error.
[d]lipids extracted by the method of Bligh & Dyer with the major exception that phase separation occured in a freezer overnight instead of the traditional phase separation at room temperature or with a centrifuge.

Example 6

SPI From Commercial Hexane Defatted Flakes

Hexane defatted flakes obtained from a commercial source were processed into soy protein isolates as discussed in Examples 2 and 3 above, with the exceptions that the samples were sprayed dried, and Tenox™ GT-2 antioxidant at about 1000 ppm tocopherals based on lipid content was utilized instead of Tenox™ 20 antioxidant. These soy protein isolates were then evaluated as disclosed in Example 4 above, with results presented in TABLE III below.

above. Soy protein isolates were prepared from this flour as described in Examples 2 and 3 above, with the exceptions that the samples were spray dried and a mixture of Tenox™ GT-2 antioxidant and Tenox™ 20 antioxidant was used instead of Tenox™ 20 antioxidant. Tenox™ GT-2 antioxidant was utilized at a level of 1000 ppm, and Tenox™ 20 antioxidant was utilized at a level of 200 ppm, both based on the amount of lipids. These soy protein isolates were evaluated as described in Example 4 above, with results presented in TABLE IV below.

TABLE III[a]

EVALUATION OF SPI FROM COMMERCIALLY AVAILABLE FLAKES

|  | SPI FROM COMMERCIAL FLAKES WITH TENOX ™ GT-2 antioxidant | SPI FROM COMMERCIAL FLAKES WITH TENOX ™ 22 antioxidant | CONTROL SPI FROM COMMERCIAL FLAKES |
| --- | --- | --- | --- |
| % Moisture | 5.31 (0.02)[c] | 4.17 (0.06) | 3.87 (0.02) |
| % Protein (N × 5.71)[b] | 89.97 (0.02) | 85.74 (0.08) | 85.31 (0.21) |
| % Protein Solubility (pH 6.8 +/− 0.2)[b] | 81 (1.1) | 83 (0.6) | 74 (0.3) |
| % Total Lipids[bd] | 2.33 (0.01) | 2.41 (0.02) | 2.8 (0.05) |

[a]the % Moisture and % Protein values are the mean of triplicate determinations, and the % Protein Solubility and % Total Lipids are the mean of triplicate determinations on duplicate extractions.
[b]% by weight on dry basis.
[c]figures in parenthesis are standard error.
[d]lipids extracted by the method of Bligh & Dyer with the major exception that phase separation occured in a freezer overnight instead of the traditional phase separation at room temperature or with a centrifuge.

Example 7

SPI From Hutcheson Variety Soybeans

Hexane defatted soybean flour was prepared from Hutcheson variety soybeans as described in Example 1

TABLE IV[a]

EVALUATION OF SPI FROM HUTCHESON VARIETY SOYBEANS

|  | SPI FROM HUTCHEON VARIETY SOYBEANS WITH TENOX ™ 20 antioxidant & WITH TENOX ™ GT-2 antioxidant | SPI FROM HUTCHEON VARIETY SOYBEANS WITH TENOX ™ 22 antioxidant | SPI FROM HUTCHEON VARIETY SOYBEANS (CONTROL) |
| --- | --- | --- | --- |
| % Moisture | 6.16 (0.02)[c] | 5.99 (0.01) | 6.68 (0.02) |

TABLE IV[a]-continued

EVALUATION OF SPI FROM HUTCHESON VARIETY SOYBEANS

| | SPI FROM HUTCHEON VARIETY SOYBEANS WITH TENOX ™ 20 antioxidant & WITH TENOX ™ GT-2 antioxidant | SPI FROM HUTCHEON VARIETY SOYBEANS WITH TENOX ™ 22 antioxidant | SPI FROM HUTCHEON VARIETY SOYBEANS (CONTROL) |
|---|---|---|---|
| % Protein (N × 5.71)[b] | 86.33 (0.54) | 85.43 (0.24) | 85.12 (0.21) |
| % Protein Sotubility (pH 6.8 +/− 0.2)[b] | 76 (0.4) | 76 (1.2) | 68 (0.5) |
| % Total Lipids[bd] | 5.47 (0.05) | 5.87 (0.01) | 5.85 (0.2) |

[a]the % Moisture and % Protein values are the mean of triplicate determinations, and the % Protein Solubility and % Total Lipids are the mean of triplicate determinations on duplicate extractions.
[b]% by weight on dry basis.
[c]figures in parenthesis are standard error.
[d]lipids extracted by the method of Bligh & Dyer with the major exception that phase separation occured in a freezer overnight instead of the traditional phase separation at room temperature or with a centrifuge.

Example 8

Evaluation of Protein Yield

To evaluate the protein yield of the present invention, commercially-prepared hexane defatted flakes were obtained from both commercial sources I and II of Example 5.

The defatted flakes from both commercial sources I and II were processed (each in duplicate) by dispersing the samples into water, followed by the additon of 1 N sodium hydroxide until a pH of 9 was stabilized. The defatted flakes from commercial sources I and II were similarly processed (each in duplicate) except that Tenox™ GT-2 antioxidant was added to provide about 1000 ppm tocopherols on a lipid basis. After holding the mixures at pH 9 for about 30 minutes, a portion of each slurry was centrifuged at 10,000×g for about 10 minutes, and then assayed for protein in the supernatant. Results are presented in TABLE V below.

TABLE V[a]

EVALUATION OF PROTEIN YIELD

| | SAMPLE FROM COMMERCIAL SOURCE I | SAMPLE FROM COMMERCIAL SOURCE II |
|---|---|---|
| CONTROL SAMPLE (grams soluble protein N × 5.7114 ml supernatant) | 0.1293 (0.0002)[b] | 0.1426 (0.0010) |
| SAMPLE WITH TENOX ™ GT-2 antioxidant soluble protein N × 5.1114 ml supernatant) | 0.1323 (0.0003) | 0.1492 (0.0008) |
| PERCENT INCREASE | 2.36% | 4.63% |

[a] = values are the mean of triplicate determinations on duplicate extracts.
[b] = values in parenthesis are standard errors.
[c] = approximately 1000 ppm tocopherols on a lipid basis.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled the art to which this invention pertains.

I claim:

1. A method of extracting protein from defatted plant material, comprising:
    (a) contacting together defatted plant material comprising protein, with antioxidant and water wherein a portion of the protein is solubilized in the water; and
    (b) recovering the protein from the water.

2. The method of claim 1 wherein the protein is recovered from the water by a process selected from the group consisting of filtration and centrifuging.

3. The method of claim 1 further including the step of adjusting the pH of the water to above 7, prior to step (b), to increase the portion of the protein solubilized in the water.

4. The method of claim 1 wherein the antioxidant is selected from the group consisting of substituted and unsubstituted quinones, anisoles, toluenes, tocopherols, gallates, esters, esters of benzoic acids, and antioxidants derived from plants.

5. The method of claim 1, wherein the de-fatted plant material comprises at least one selected from the group of antioxidants consisting of soy beans, sunflower, peanut, sesame, cottonseed, and wheat.

6. A method of extracting protein from defatted plant material, comprising:
    (a) contacting together antioxidant, water and defatted plant material comprising protein wherein a portion of the protein is solubilized in the water;
    (b) adjusting the pH of the water to above 7 to increase the portion of the protein solubilized in the water; and
    (c) recovering the protein from the water.

7. The method of claim 6 wherein the protein is recovered from the water by a process selected from the group consisting of filtration and centrifuging.

8. The method of claim 6 wherein the antioxidant is selected from the group consisting of substituted and unsubstituted quinones, anisoles, toluenes, tocopherols, gallates, esters, esters of benzoic acids, and antioxidants derived from plants.

9. The method of claim 6 wherein the de-fatted plant material comprises at least one selected from the group of antioxidants consisting of soy beans, sunflower, peanut, sesame, cottonseed, and wheat.

10. A method of extracting a highly soluble food grade plant protein from defatted soy bean material, comprising:

(a) contacting together defatted plant material comprising protein, with antioxidant and water wherein a portion of the protein is solubilized in the water; and (b) recovering the protein from the water.

11. The method of claim 10 wherein the protein is recovered from the water by a process selected from the group consisting of filtration and centrifuging.

12. The method of claim 10 further including the step of adjusting the pH of the water to above 7, prior to step (b), to increase the portion of the protein solubilized in the water.

13. The method of claim 10 wherein the antioxidant is selected from the group consisting of substituted and unsubstituted quinones, anisoles, toluenes, tocopherols, gallates, esters, esters of benzoic acids, and antioxidants derived from plants.

14. The method of claim 10, wherein the de-fatted plant material comprises at least one selected from the group of antioxidants consisting of soy beans, sunflower, peanut, sesame, cottonseed, and wheat.

* * * * *